United States Patent
Shih et al.

(10) Patent No.: US 8,045,649 B2
(45) Date of Patent: Oct. 25, 2011

(54) CARRIER RECOVERY SYSTEM AND CARRIER RECOVERY METHOD

(75) Inventors: Pei-Jun Shih, Tainan County (TW); Jeng-Shiann Jiang, Tainan County (TW)

(73) Assignee: Himax Technologies Limited, Tainan County (TW)

(*) Notice: Subject to any disclaimer, the term of this patent is extended or adjusted under 35 U.S.C. 154(b) by 903 days.

(21) Appl. No.: 12/036,330

(22) Filed: Feb. 25, 2008

(65) Prior Publication Data

US 2009/0213921 A1 Aug. 27, 2009

(51) Int. Cl.
*H04L 27/00* (2006.01)
(52) U.S. Cl. ............................ 375/326; 375/229
(58) Field of Classification Search .............. 375/316, 375/326, 229–236
See application file for complete search history.

(56) References Cited

U.S. PATENT DOCUMENTS

| | | | |
|---|---|---|---|
| 5,673,293 A * | 9/1997 | Scarpa et al. | 375/321 |
| 6,904,098 B1 * | 6/2005 | Isaksen et al. | 375/261 |
| 2002/0024995 A1 * | 2/2002 | Kim | 375/231 |
| 2007/0172001 A1 * | 7/2007 | Kitta et al. | 375/326 |
| 2008/0031316 A1 * | 2/2008 | Maxim et al. | 375/232 |
| 2008/0063043 A1 * | 3/2008 | Xia et al. | 375/233 |

\* cited by examiner

*Primary Examiner* — Chieh M. Fan
*Assistant Examiner* — Freshteh N Aghdam
(74) *Attorney, Agent, or Firm* — Thomas, Kayden, Horstemeyer & Risley, LLP (57) ABSTRACT

The invention provides carrier recovery systems and carrier recovery methods. The carrier recovery system comprises a compensation signal generator, a compensation device and a mode selector. The compensation signal generator generates a compensation signal based on a coherent demodulated signal. In a first mode, the compensate device is couple behind an equalizer; the coherent demodulated signal is generated by the compensation device which compensates the output of the equalizer with the compensation signal. In a second mode, the compensate device is coupled prior to the equalizer, compensating the output of a synchronizer with the compensation signal to generate the input of the equalizer. In the second mode, the compensation signal generator receives the output of the equalizer as the coherent demodulated signal. The mode selector switches the carrier recover system from the first mode to the second mode when an estimated frequency offset satisfies a first criterion.

16 Claims, 6 Drawing Sheets

CARRIER RECOVERY SYSTEM AND
CARRIER RECOVERY METHOD

BACKGROUND OF THE INVENTION

1. Field of the Invention

The present invention relates to carrier recovery systems and carrier recovery methods.

2. Description of the Related Art

In communication systems using Quadrature Amplitude Modulation (QAM), such as OpenCable and DVB-C communication systems, receivers have to compensate for frequency offset and phase offset by blind methods since a transmitted signal has no pilot and training sequence. The blind methods are named carrier recovery.

There are many solutions for carrier recovery. One conventional carrier recovery technique compensates for frequency and phase offsets at the output terminal of the equalizer. This conventional technique provides a wide frequency offset estimation range (such as up to 300 KHz) but has a bad performance at the equalizer since the signal inputted into the equalizer includes the uncompensated frequency offset. Another conventional carrier recovery technique compensates for frequency and phase offsets at the input terminal of the equalizer. This conventional technique provides a good performance equalizer but limits the frequency offset estimation range (only up to 40 KHz for example).

Thus, novel carrier recovery techniques providing good performance equalizer and wide frequency offset estimation range are called for.

BRIEF SUMMARY OF THE INVENTION

The invention provides carrier recovery systems and carrier recovery methods. The carrier recovery system comprises a compensation signal generator, a compensation device and a mode selector. The compensation signal generator generates a compensation signal based on a coherent demodulated signal. In a first mode, the compensate device is coupled behind an equalizer, and the coherent demodulated signal is generated by the compensation device which compensates the output of the equalizer with the compensation signal. In a second mode, the compensate device is coupled prior to the equalizer, compensating the output of a synchronizer with the compensation signal to generate the input of the equalizer. In the second mode, the compensation signal generator receives the output of the equalizer as the coherent demodulated signal. The mode selector switches the carrier recover system from the first mode to the second mode when an estimated frequency offset satisfies a first criterion.

The following describes the carrier recovery method of the invention. The method comprises generating a compensation signal based on a coherent demodulated signal. In a first mode, the coherent demodulated signal is generated by compensating the output of an equalizer with a compensation signal. In a second mode, the input of the equalizer is generated by compensating the output of a synchronizer with the compensation signal, and the output of the equalizer is regarded as the coherent demodulated signal. The method switches the operation from the first mode to the second mode when an estimated frequency offset satisfies a first criterion.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows some embodiments carrying out the invention. This description is made for the purpose of illustrating the general principles of the invention and should not be taken in a limiting sense. The scope of the invention is best determined by reference to the appended claims.

Figure 1A:
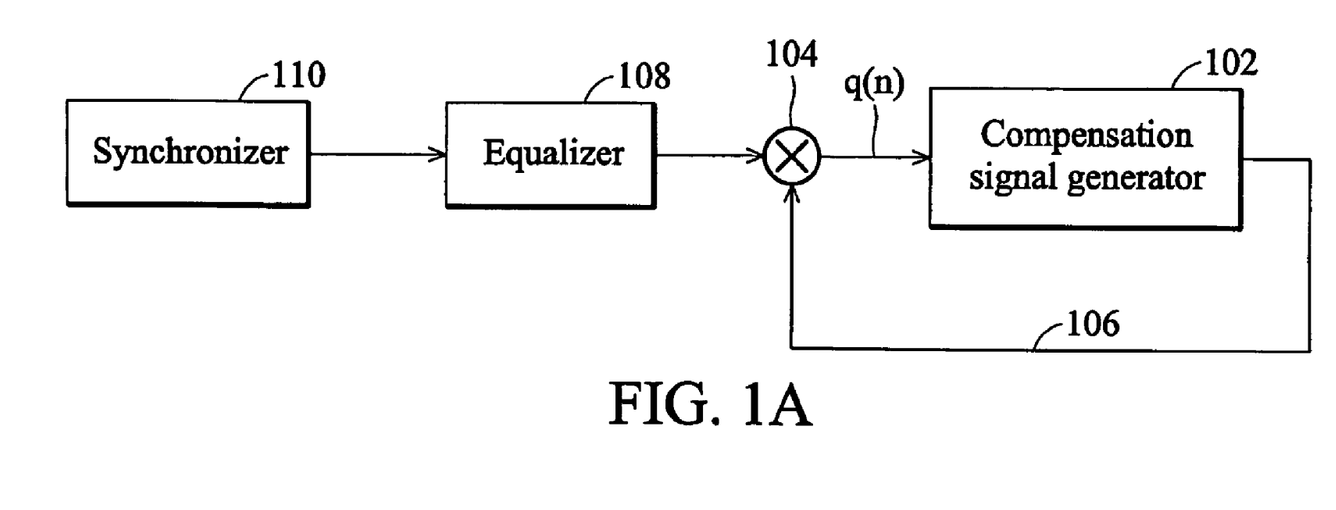
FIG. 1A illustrates an embodiment of the carrier recovery system of the invention which operates in a first mode.
Figure 1B:
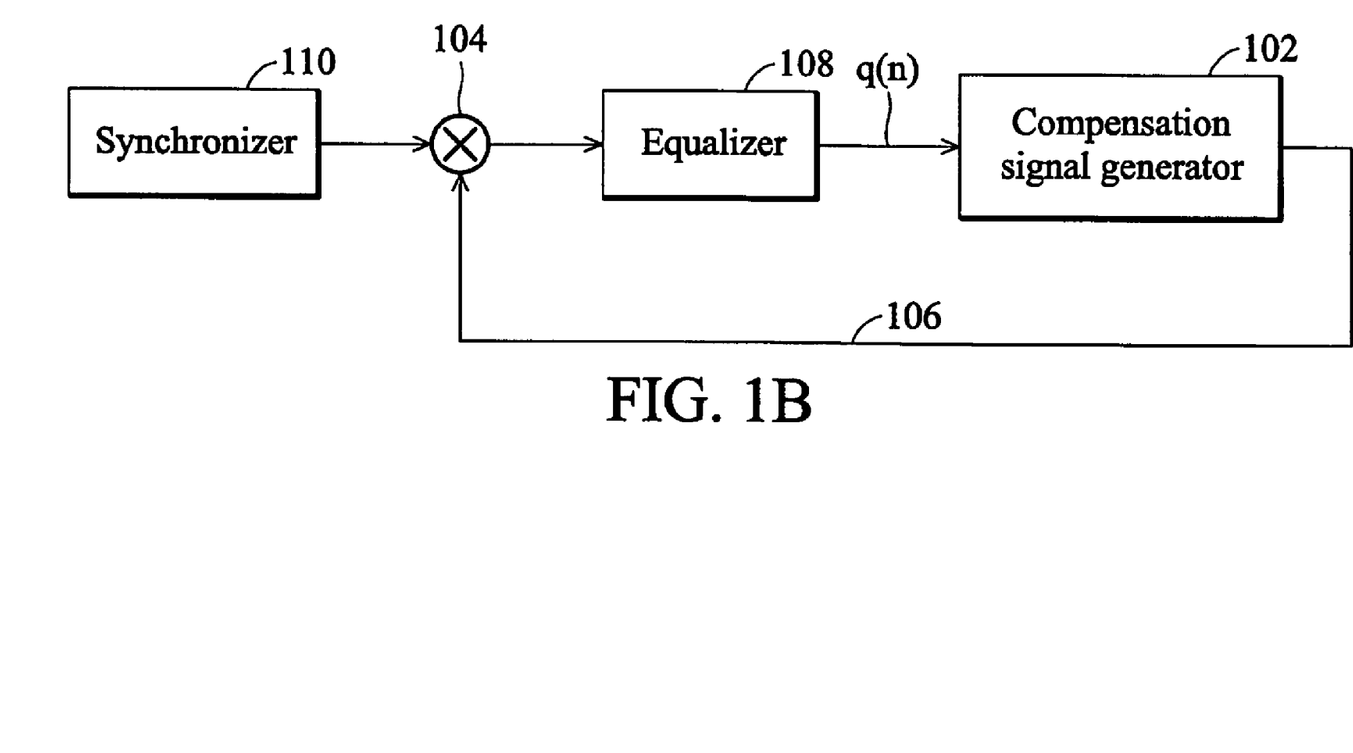
FIG. 1B illustrates an embodiment of the carrier recovery system of the invention which operates in a second mode.

FIGS. 1A and 1B illustrate the carrier recovery system of the invention in a first mode and a second mode, respectively. The carrier recovery system comprises a compensation signal generator 102, a compensation device 104 and a mode selector (not shown in FIGS. 1A and 1B). The compensation signal generator 102 generates a compensation signal 106 based on a coherent demodulated signal q(n). In the first mode (referring to FIG. 1A), the compensation device 104 is coupled behind an equalizer 108. The compensation device 104 compensates the output of the equalizer 108 with the compensation signal 106 to generate the coherent demodulated signal q(n). In the second mode (referring to FIG. 1B), instead of being coupled behind the equalizer 108, the compensation device 104 is coupled prior to the equalizer 108. As shown in FIG. 1B, the compensation device 104 compensates the output of a synchronizer 110 with the compensation signal 106 and generates the input of the equalizer 108, and the output of the equalizer 108 is sent into the compensation signal generator 102 as the coherent demodulated signal q(n). The mode selector switches the carrier recovery system from the first mode (shown in FIG. 1A) to the second mode (shown in FIG. 1B) when an estimated frequency offset satisfies a first criterion.

The first mode operation (shown by FIG. 1A) speeds up the estimation of the estimated frequency offset and allows the carrier recovery system to be applied in receivers with wide frequency offset estimation ranges. The second mode operation (shown by FIG. 1B) improves the performance of the equalizer 108. Thus, the carrier recovery system of the invention not only provides wide frequency offset estimation range but also improves the performance of the equalizer.

Figure 2A:
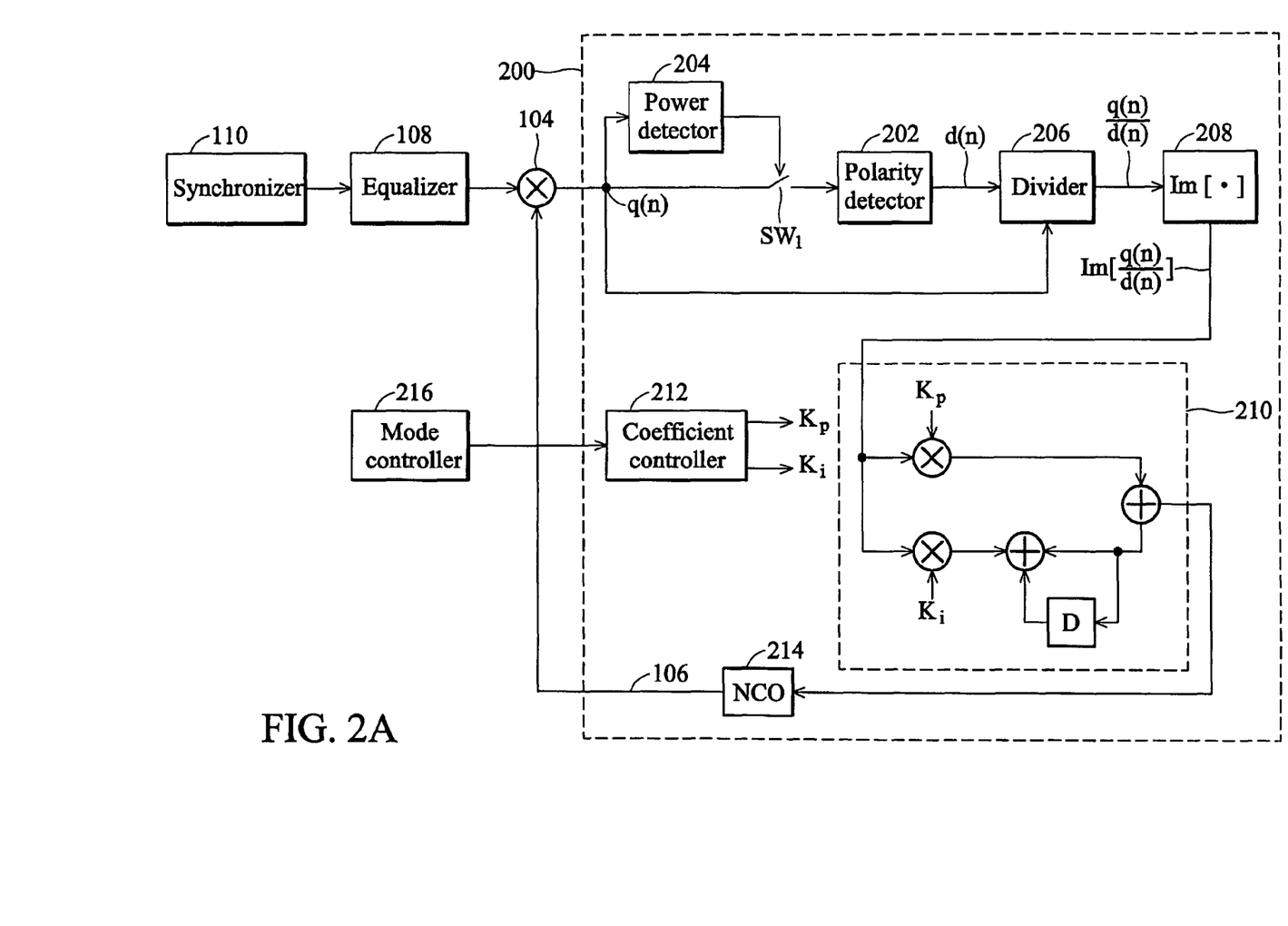
FIG. 2A relates to FIG. 1A, illustrating an embodiment of the compensation signal generator 102.
Figure 2B:
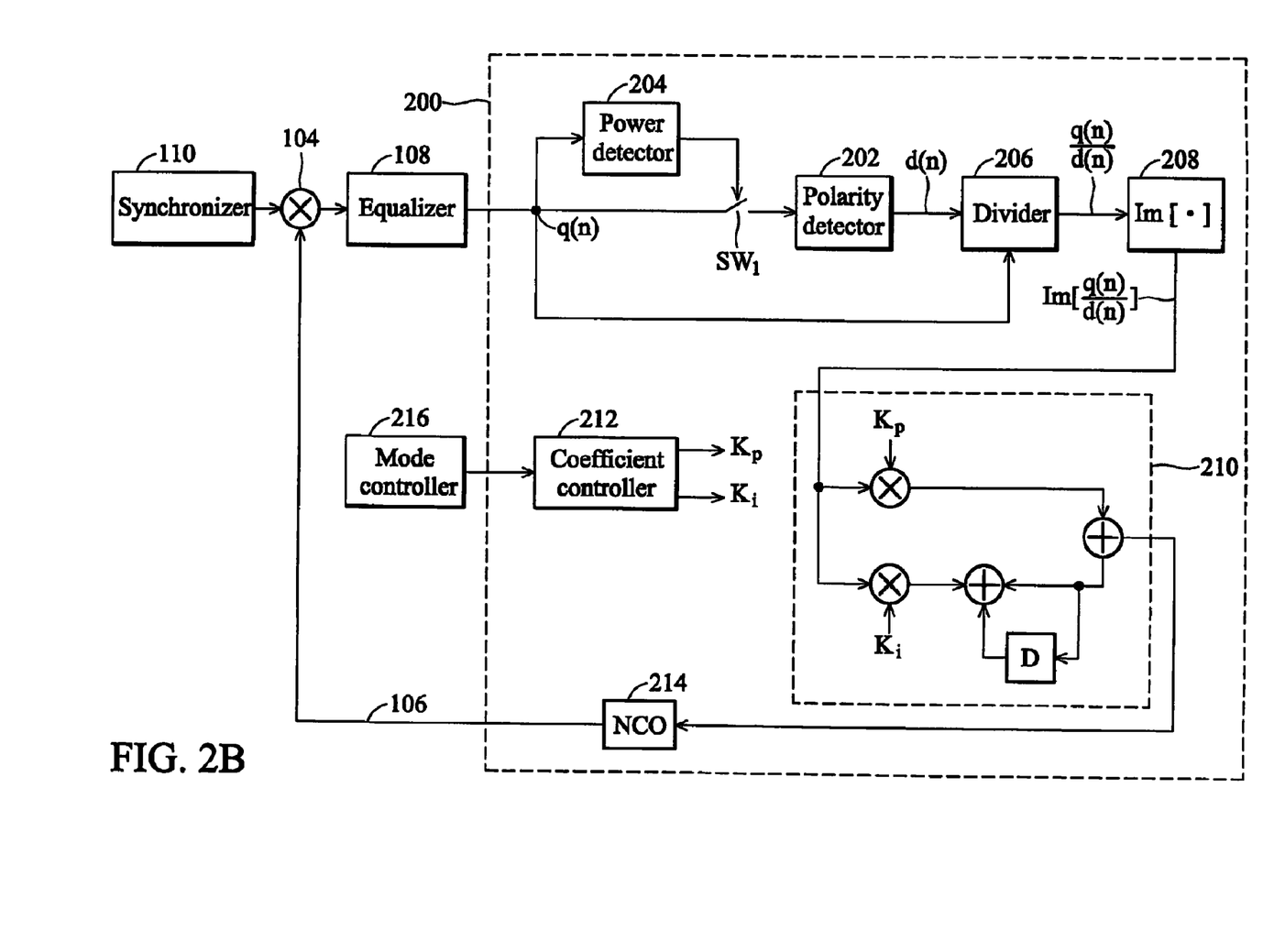
FIG. 2B relates to FIG. 1B, illustrating an embodiment of the compensation signal generator 102.

FIGS. 2A and 2B relate to FIGS. 1A and 1B, respectively, illustrating an embodiment of the compensation signal generator 102. The compensation signal generator 200 comprises a polarity detector 202, a switch $SW_1$, a power detector 204, a divider 206, an imaginary portion extractor 208, a loop filter 210, a coefficient controller 212 and a numerical controlled oscillator 214. The polarity detector 202 generates a detector output d(n) based on the input thereof. The switch $SW_1$ couples the coherent demodulated signal q(n) to the polarity detector 202 when the first switch is turned on. The power detector 204 controls the switch $SW_1$. The power detector 204 turns on the switch $SW_1$ when the magnitude of the coherent demodulated signal q(n) is greater than a threshold magnitude. The divider 206 divides the coherent demodulated signal q(n) by the detector output d(n) to get q(n)/d(n). The imaginary portion extractor 208 extracts the imaginary portion of q(n)/d(n) to generate a phase error signal Im[q(n)/d(n)]. The loop filter 210 filters the phase error signal Im[q(n)/d(n)]. The output of the loop filter 210 is sent into the numerical controlled oscillator 214 to generate the compensation signal 106. In this embodiment, the loop filter 210 has a plurality of coefficients $K_p$ and $K_i$. The value of the coefficients $K_p$ and $K_i$ are set by the coefficient controller 214.

In some embodiments, the mode controller 216 controls the coefficient controller 212 to set the coefficients $K_p$ and $K_i$ according to the mode the carrier recovery system is in. In the first mode cases (FIG. 2A), coefficient controller 212 increases the coefficients $K_p$ and $K_i$ from low to high. At the beginning of the first mode operation, the small $K_p$ and $K_i$ can speed the estimation of the estimated frequency offset when the actual frequency offset is low. If the actual frequency offset is high, the estimation of the estimated frequency offset is guaranteed by the increasing $K_p$ and $K_i$. When the carrier recovery system is switched from the first mode (FIG. 2A) to the second mode (FIG. 2B), the coefficient controller 212 may set the coefficients $K_p$ and $K_i$ to be lower than they were at the end of the first mode. Thus, discontinuous effect caused by mode switching is avoided.

Figure 3:
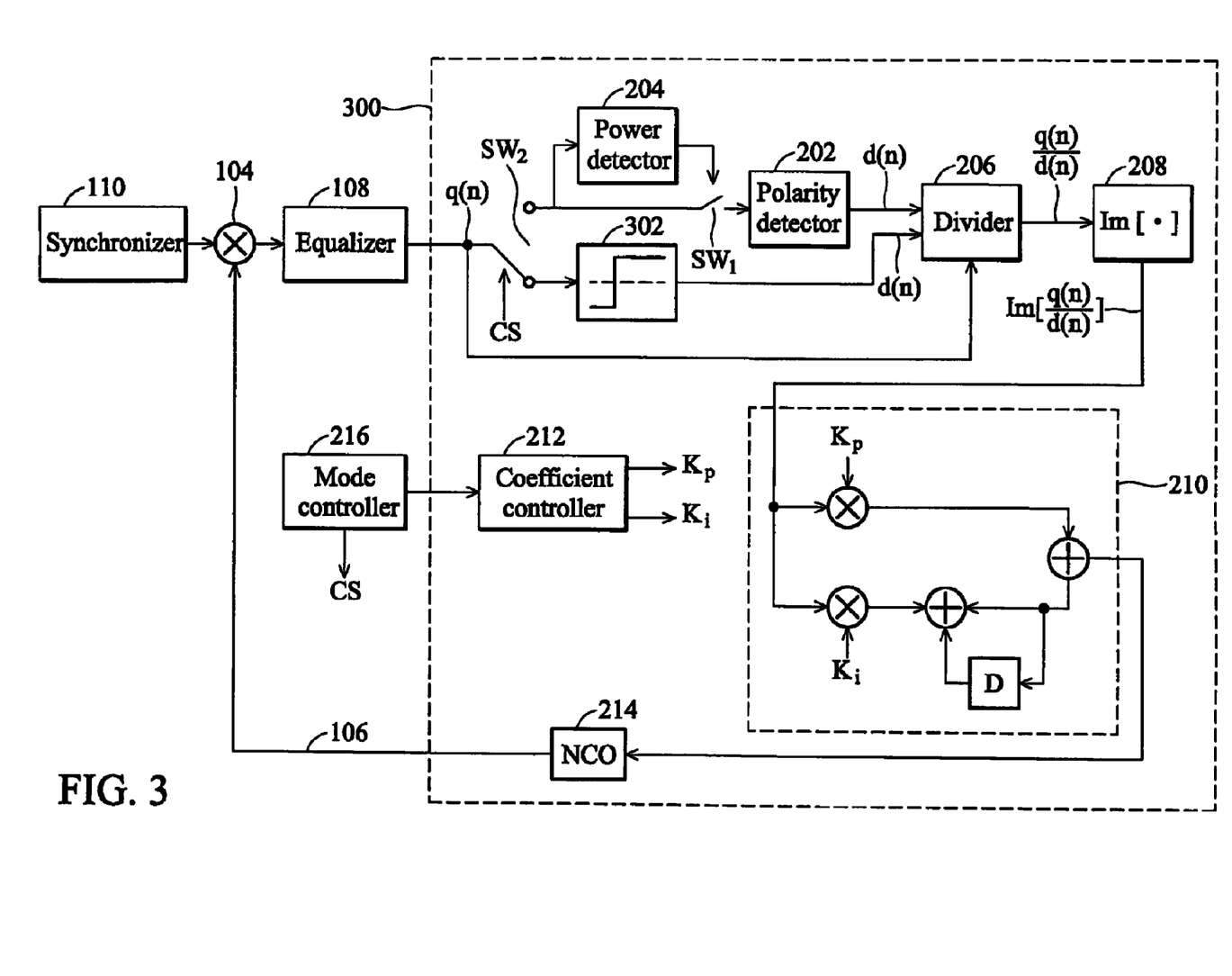
FIG. 3 illustrates an embodiment of the carrier recovery system of the invention that operates in a third mode.

In addition to the aforementioned first and second modes, the carrier recovery system of the invention may be further operated in a third mode to improve the accuracy of the estimated frequency offset. In such cases, the mode selector switches the carrier recovery system from the second mode to the third mode when the estimated frequency offset satisfies a second criterion. FIG. 3 illustrates an embodiment of the carrier recovery system of the invention that operates in the third mode. The compensation device 104 is coupled prior to the equalizer 108, and generates the input of the equalizer 108 by compensating the output of the synchronizer 110 with the compensation signal 106. The output of the equalizer 108 is sent into the compensation signal generator 300 as the coherent demodulated signal q(n). Comparing the compensation signal generator 300 with the compensation signal generator 200, the compensation signal generator 300 further comprises a switch $SW_2$ and a hard decision device 302. In the first and second modes, switch $SW_2$ couples the coherent demodulated signal q(n) into the power detector 204 and the polarity detector 204 to generate the detector output d(n). In the third mode, switch $SW_2$ couples the coherent demodulated signal q(n) into the hard decision device 302 instead. The hard decision device 302 is used for generating the detector output d(n).

In some embodiments, when the carrier recovery system is switched from the second mode to the third mode, the coefficient controller 212 may set the coefficients $K_p$ and $K_i$ to be lower than they were in the second mode to overcome discontinuous effect caused by mode switching.

Referring to FIG. 3, when the carrier recovery system is in the third mode (wherein the switch $SW_2$ couples the coherent demodulated signal q(n) into the hard decision device 302), the mode selector 216 monitors the estimated frequency offset provided by the compensation signal generator 300. When the estimated frequency offset satisfies a third criterion, the loop filter 210 adopts the final coefficients $K_p$ and $K_i$ and the mode selector 216 switches the carrier recovery system from the third mode to a fourth mode to pass the coherent demodulated signal q(n) to a decoder of the receiver (such as a TCM decoder, not shown in FIG. 3). In the fourth mode, the compensation device 104 is still allocated prior to the equalizer 108 to generate the input of the equalizer 108 by compensating the output of the synchronizer 110 with the compensation signal 106, and in addition to be passed to the decoder, the coherent demodulated signal q(n) is still coupled into the hard decision device 302 by switch $SW_2$ to generate the detector output d(n).

The mode selector of the invention can be realized by many ways. In an embodiment of the invention, N successive samples are considered as one sample group. The compensation signal generator provides information about the estimated frequency offset of each sample. The mode selector averages the estimated frequency offsets of the samples in each sample group to get average estimated frequency offsets of a plurality of sample groups. When the average estimated frequency offsets of $M_1$ (a first specific number) successive sample groups all vary within a first region (the first criterion), the mode selector switches the carrier recovery system from the first mode to the second mode. When the average estimated frequency offsets of $M_2$ (a second specific number) successive sample groups all vary within a second region (the second criterion), the mode selector switches the carrier recovery system from the second mode to the third mode. When the average estimated frequency offsets of $M_3$ (a third specific number) successive sample groups all vary within a third region (the third criterion), the mode selector switches the carrier recovery system from the third mode to the fourth mode. In some embodiments, the second specific number $M_2$ is set to be greater than the first specific number $M_1$ and the second region is set to be smaller than the first region, thus the mode switching from the second mode to the third mode is stricter than the mode switching from the first mode to the second mode. In some embodiments, the third specific number $M_3$ is set to be greater than the second specific number $M_2$ and the third region is set to be smaller than the second region, thus the mode switching from the third mode to the fourth mode is stricter than the mode switching from the second mode to the first mode.

Figure 4:
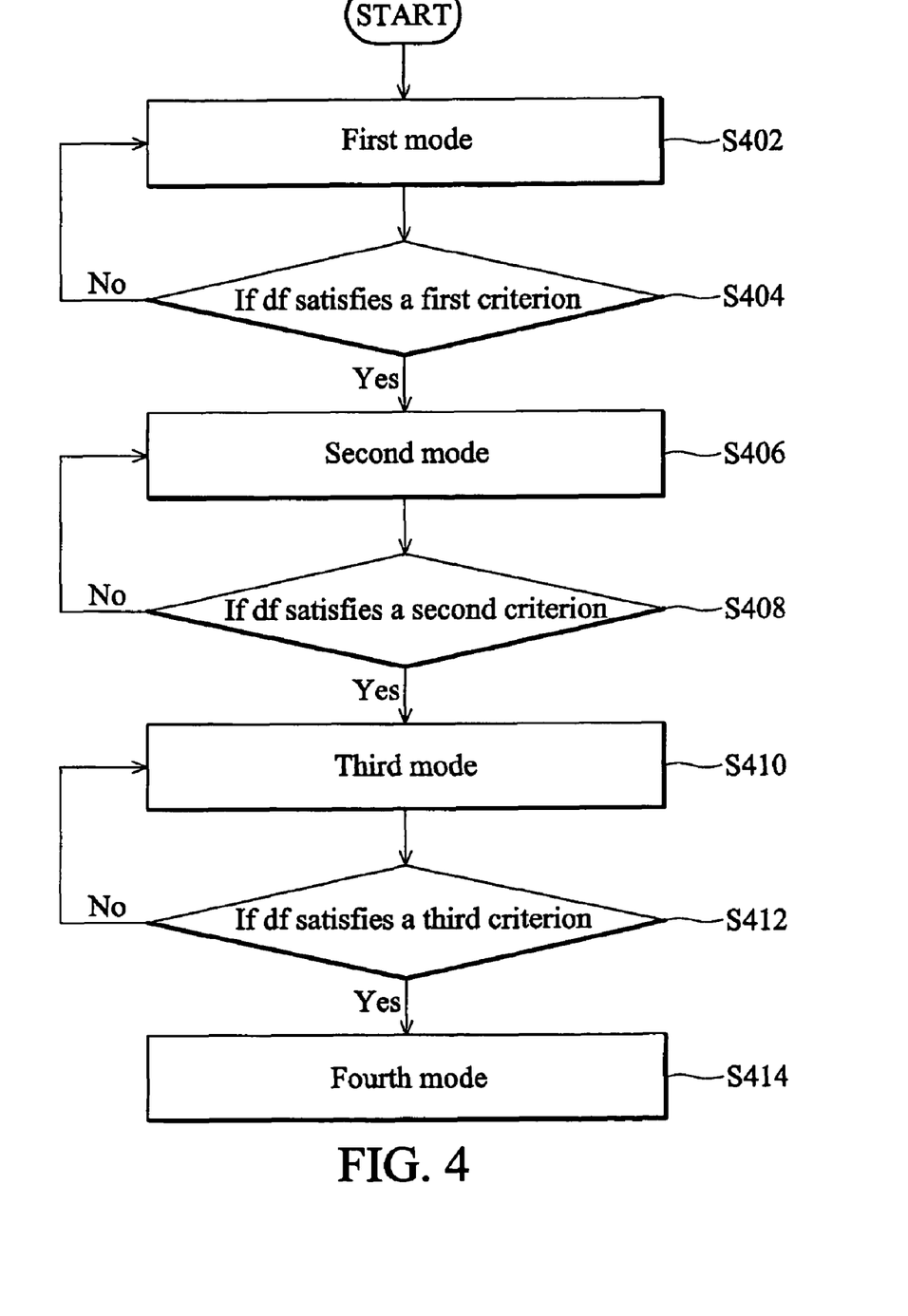
FIG. 4 illustrates an embodiment of the carrier recovery method of the invention.

FIG. 4 illustrates an embodiment of the carrier recovery method of the invention. The carrier recovery method generates a compensation signal based on a coherent demodulated signal. In step S402, the beginning of the carrier recovery method, the carrier recovery method works a first mode operation, which compensates the output of an equalizer with the compensation signal to generate the coherent demodulated signal. In step S404, the carrier recovery method determines whether an estimated frequency offset (abbreviated to df) satisfies a first criterion. When df satisfies the first criterion, the carrier recovery method moves to step S406 to work a second mode operation, which compensates the output of a synchronizer with the compensation signal to generate the input of the equalizer and regards the output of the equalizer as the coherent demodulated signal. When df does not satisfy the first criterion, the carrier recovery method moves back to step S402 to continue the first mode operation.

In some embodiments, the first and second mode operations comprises: determining whether the magnitude of the coherent demodulated signal is greater than a threshold magnitude; transmitting the coherent demodulated signal into a polarity detector to generate a detector output when the magnitude of the coherent demodulated signal is greater than the threshold magnitude; dividing the coherent demodulated signal by the detector output and extracting the imaginary portion thereof to generate a phase error signal; filtering the phase error signal by a loop filter having a plurality of coefficients; and transmitting the output of the loop filter to a numerical controlled oscillator to generate the compensation signal.

In some embodiments, the carrier recovery system increases the coefficients of the loop filter from low to high in the first mode operation. In some embodiments, the second mode operation sets the coefficients of the loop filter to be lower than they were at the end of the first mode operation.

In some embodiments, when the second mode operation converges, the coherent demodulated signal is passed to a decoder of the receiver.

To improve the accuracy of the estimated frequency offset df, some embodiments further proceeds to step S408, in which the carrier recovery method determines whether df satisfies a second criterion. When df satisfies the second criterion, the carrier recovery method moves to step S410 to work a third mode operation. When df does not satisfies the second criterion, the carrier recovery method moves back to step S406 to continue the second mode operation.

In some embodiments, the third mode operation generates the input of the equalizer by compensating the output of the synchronizer with the compensation signal, and regards the output of the equalizer as the coherent demodulated signal. The third mode operation generates the compensation signal by the following steps: 1) transmit the coherent demodulated signal into a hard decision device to generate the detector output; 2) divide the coherent demodulated signal by the detector output and extract the imaginary portion thereof to generate the phase error signal; 3) filter the phase error signal by the loop filter; and 4) transmit the output of the loop filter to the numerical controlled oscillator to generate the compensation signal. In some embodiments, the third mode operation sets the coefficients of the loop filter to be lower than they were in the second mode operation.

Step S412 determines whether the third mode operation converges. When df satisfies a third criterion, the carrier recovery method moves to step S414 to work a fourth mode operation. When df does not satisfy the third criterion, the carrier recovery method moves back to step S410 to continue the third mode operation.

In some embodiments, the fourth mode operation generates the input of the equalizer by compensating the output of the synchronizer with the compensation signal and regards the output of the equalizer as the coherent demodulated signal which is used in generating the compensation signal. In the fourth mode operation, the detector output is generated by the hard decision device, and the coherent demodulated signal is sent into a decoder of the receiver.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A carrier recovery system, comprising:
   a compensation signal generator, generating a compensation signal based on a coherent demodulated signal;
   a mode selector, switching the carrier recovery system from a first mode to a second mode when an estimated frequency offset satisfies a first criterion; and
   a compensation device, wherein, when the carrier recovery system is in the first mode, the compensation device generates the coherent demodulated signal for the compensation signal generator by compensating an output of an equalizer with the compensation signal, and, when the carrier recovery system is in the second mode, the compensation device compensates an output of a synchronizer with the compensation signal to generate an input of the equalizer while the output of the equalizer is received by the compensation signal generator as the coherent demodulated signal;
   wherein the compensation signal generator comprises:
   a polarity detector, generating a detector output based on an input thereof;
   a first switch, coupling the coherent demodulated signal to the polarity detector as the input of the polarity detector when the first switch is turned on;
   a power detector, turning on the first switch when magnitude of the coherent demodulated signal is greater than a threshold magnitude;
   a divider and an imaginary portion extractor, dividing the coherent demodulated signal by the detector output and extracting an imaginary portion of an output of the divider to generate a phase error signal;
   a loop filter, filtering the phase error signal and having a plurality of coefficients;
   a coefficient controller, setting the coefficients; and
   a numerical controlled oscillator, receiving an output of the loop filter and outputting the compensation signal.

2. The carrier recovery system as claimed in claim 1, wherein the coefficient controller increases the coefficients from low to high in the first mode.

3. The carrier recovery system as claimed in claim 1, wherein the coefficient controller sets the coefficients in the second mode to be lower than the coefficients at the end of the first mode.

4. The carrier recovery system as claimed in claim 1, wherein the mode selector switches the carrier recovery system from the second mode to a third mode when the estimated frequency offset satisfies a second criterion and, in the third mode, the compensation device generates the input of the equalizer by compensating the output of the synchronizer with the compensation signal and the compensation signal generator receives the output of the equalizer as the coherent demodulated signal, and, the compensation signal generator further comprises a second switch and a hard decision device for the third mode, the second switch couples the coherent demodulated signal received by the compensation signal generator into the power detector to control the first switch when the carrier recovery system is in the first and the second modes and, when the carrier recovery system is in the third mode, the second switch is switched to couple the coherent demodulated signal received by the compensation signal generator into the hard decision device to replace the polarity detector to generate the detector output for the divider.

5. The carrier recovery system as claimed in claim 4, wherein the coefficient controller sets the coefficients in the third mode to be lower than the coefficients in the second mode.

6. The carrier recovery system as claimed in claim 4, wherein the mode selector switches the carrier recovery system from the third mode to a fourth mode when the estimated frequency offset satisfies a third criterion and, in the fourth mode, the compensation device generates the input of the equalizer by compensating the output of the synchronizer with the compensation signal, the compensation signal generator receives the output of the equalizer as the coherent demodulated signal, and the coherent demodulated signal that is coupled to the hard decision device by the second switch is further passed to a decoder.

7. The carrier recovery system as claimed in claim 6, wherein the mode selector estimates average estimated frequency offsets of a plurality of sample groups, switches the carrier recovery system from the first mode to the second mode when the average estimated frequency offsets of a first specific number of successive sample groups all vary within a first region, switches the carrier recovery system from the second mode to the third mode when the average estimated frequency offsets of a second specific number of successive sample groups all vary within a second region and switches the carrier recovery system from the third mode to the fourth mode when the average estimated frequency offsets of a third specific number of successive sample groups all vary within a third region.

8. The carrier recovery system as claimed in claim 7, wherein the third specific number is greater than the second specific number and the second specific number is greater than the first specific number, and the third region is smaller than the second region and the second region is smaller than the first region.

9. A carrier recovery method, comprising:
generating a compensation signal based on a coherent demodulated signal;
generating the coherent demodulated signal in a first mode by compensating an output of an equalizer with the compensation signal;
directly regarding the output of the equalizer as the coherent demodulated signal in a second mode while an input of the equalizer is generated by compensating an output of a synchronizer with the compensation signal; and
switching from the first mode to the second mode when an estimated frequency offset satisfies a first criterion;
wherein, in the first and second modes, the step of generating the compensation signal comprises:
determining whether magnitude of the coherent demodulated signal is greater than a threshold magnitude;
transmitting the coherent demodulated signal into a polarity detector to generate a detector output when the magnitude of the coherent demodulated signal is greater than the threshold magnitude;
dividing the coherent demodulated signal by the detector output and extracting an imaginary portion thereof, to generate a phase error signal;
filtering the phase error signal by a loop filter having a plurality of coefficients; and
transmitting the output of the loop filter to a numerical controlled oscillator to generate the compensation signal.

10. The carrier recovery method as claimed in claim 9, further comprising increasing the coefficients from low to high in the first mode.

11. The carrier recovery method as claimed in claim 9, further comprising setting the coefficients in the second mode to be lower than the coefficients at the end of the first mode.

12. The carrier recovery method as claimed in claim 9, further comprising:
switching from the second mode to a third mode when the estimated frequency offset satisfies a second criterion;
wherein, in the third mode, the output of the equalizer is regarded as the coherent demodulated signal in the third mode while the input of the equalizer is generated by compensating the output of the synchronizer with the compensation signal, and the coherent demodulated signal is switched to a hard decision device which replaces the polarity detector to generate the detector output.

13. The carrier recovery method as claimed in claim 12, further comprising setting the coefficients in the third mode to be lower than the coefficients in the second mode.

14. The carrier recovery method as claimed in claim 12, further comprising switching from the third mode to a fourth mode when the estimated frequency offset satisfies a third criterion and, in the fourth mode, the input of the equalizer is generated by compensating the output of the synchronizer with the compensation signal while the output of the equalizer is regarded as the coherent demodulated signal that is coupled to the hard decision device as well as passed to a decoder.

15. The carrier recovery method as claimed in claim 14, further comprising:
estimating average estimated frequency offsets of a plurality of sample groups;
switching from the first mode to the second mode when the average estimated frequency offsets of a first specific number of successive sample groups all vary within a first region;
switching from the second mode to the third mode when the average estimated frequency offsets of a second specific number of successive sample groups all vary within a second region; and
switching from the third mode to the fourth mode when the average estimated frequency offsets of a third specific number of successive sample groups all vary within a third region.

16. The carrier recovery method as claimed in claim 15, wherein the third specific number is greater than the second specific number and the second specific number is greater than the first specific number, and the third region is smaller than the second region and the second region is smaller than the first region.

* * * * *